(12) United States Patent
Shimizu et al.

(10) Patent No.: US 11,287,837 B2
(45) Date of Patent: Mar. 29, 2022

(54) FLOW RATE CONTROL UNIT

(71) Applicant: TOFLO CORPORATION, Hino (JP)

(72) Inventors: Kenichi Shimizu, Hino (JP); Yuki Kamizuru, Hino (JP); Takahiro Kawamoto, Hino (JP); Kouichi Mikumo, Hino (JP)

(73) Assignee: TOFLO CORPORATION, Tokyo (JP)

( * ) Notice: Subject to any disclaimer, the term of this patent is extended or adjusted under 35 U.S.C. 154(b) by 130 days.

(21) Appl. No.: 16/645,060

(22) PCT Filed: Sep. 7, 2017

(86) PCT No.: PCT/JP2017/032375
§ 371 (c)(1),
(2) Date: Mar. 6, 2020

(87) PCT Pub. No.: WO2019/049291
PCT Pub. Date: Mar. 14, 2019

(65) Prior Publication Data
US 2020/0201365 A1 Jun. 25, 2020

(51) Int. Cl.
*G05D 7/06* (2006.01)
*F15B 13/08* (2006.01)

(52) U.S. Cl.
CPC ....... *G05D 7/0652* (2013.01); *F15B 13/0825* (2013.01); *G05D 7/0664* (2013.01)

(58) Field of Classification Search
CPC ............. Y10T 137/87877; F16K 11/22; F15B 13/0825; G05D 7/0652; G05D 7/0664
See application file for complete search history.

(56) References Cited

U.S. PATENT DOCUMENTS

| | | | | |
|---|---|---|---|---|
| 4,157,149 A | * | 6/1979 | Moen | B05C 5/0279 118/411 |
| 5,469,880 A | * | 11/1995 | Zimmerly | B67C 3/28 137/240 |
| 6,036,107 A | * | 3/2000 | Aspen | A01M 7/0089 137/883 |
| 8,251,087 B2 | * | 8/2012 | Hecht | F16K 27/003 137/271 |
| 8,522,824 B2 | * | 9/2013 | Feldmeier | F16K 11/20 137/883 |

(Continued)

FOREIGN PATENT DOCUMENTS

JP H5-84747 A 4/1993
JP 2017-174427 A 9/2017

*Primary Examiner* — Seth W. Mackay-Smith
(74) *Attorney, Agent, or Firm* — Muncy, Geissler, Olds & Lowe, P.C.

(57) ABSTRACT

The flow rate control unit 1 is comprised with each of the flow rate control devices 11 connected to (juxtaposedly mounted on) the manifold 2 by the joint 91 interposed between each of the flow rate control devices 11 and the manifold 2. Each of the flow rate control devices 11 can be attached to or detached from the manifold 2 by manually operating (attaching/detaching) the clip 93 without using a tool. Because there is no need to secure space to insert a tool between the adjacent flow rate control devices 11, the mounting pitch between the adjacent flow rate control devices 11 (joints 91) can be reduced to the minimum, allowing miniaturization of the flow rate control unit 1.

6 Claims, 5 Drawing Sheets

(56) References Cited

U.S. PATENT DOCUMENTS

| | | | |
|---|---|---|---|
| 8,622,069 B2* | 1/2014 | Ferreira | F16K 1/446 |
| | | | 137/15.06 |
| 9,371,947 B2* | 6/2016 | Choi | F16L 19/065 |
| 2003/0102039 A1* | 6/2003 | Marzorati | F16K 27/003 |
| | | | 137/883 |
| 2005/0284529 A1* | 12/2005 | Iwabuchi | F15B 13/0892 |
| | | | 137/884 |

* cited by examiner

FLOW RATE CONTROL UNIT

TECHNOLOGY FIELD

This invention relates to a flow rate control unit configured by mounting flow rate control devices juxtaposed on a manifold.

BACKGROUND

For example, disclosed in Patent Document 1 is a technique to control the flow of a fluid flowing in a circuit by connecting between a fluid temperature adjusting machine and a switching manifold by piping and switching the opening/closing of an electromagnetic switching valve embedded in the switching manifold.

RELATED ART

Patent Document(s)

[Patent Doc. 1] JP Laid-Open Patent Application Publication H5-84747

SUMMARY

Subject(s) to be Solved

By the way, among flow rate control devices, known is one having a flowmeter, a flow rate adjusting valve, and a control device built in. In configuring a flow rate control unit by mounting such flow rate control devices juxtaposedly on a manifold, in general a pipe connector is used for connecting each of the flow rate control devices and the manifold. Therefore, the mounting pitch of the flow rate control devices (space between adjacent flow rate control devices on the manifold) needs to be determined by considering space for operating the pipe connectors, in other words, space for inserting a tool, which caused the flow rate control unit to increase in size.

Then, this invention has been made considering the above-mentioned situation, having an objective to offer a flow rate control unit that can be miniaturized.

In order to solve the object(s), a flow rate control unit of this invention includes a manifold, a plurality of flow rate control devices juxtaposedly mounted on the manifold, and a connection means that connects the manifold and the flow rate control devices, wherein the connection means is provided with a first pipe member, a second pipe member and a clip that holds a connection part connecting the first pipe member and the second pipe member. The first pipe member is inserted into the second pipe member to be coupled. The first pipe member and the second pipe member have different axial line direction lengths, and the connection means between the adjacent flow rate control devices are disposed having the first pipe member and the second pipe member alternate.

According to the flow rate control unit of this invention, the axial line direction length of the second pipe member (H2) may be set to be equal to or more than a sum (H1+H3), herein H1 is the axial line direction length of the first pipe member (H1) and H3 is a thickness of the clip.

According to the flow rate control unit of this invention, each of the flow rate control devices may be provided with a coupler that couples the adjacent flow rate control devices.

The coupler is provided with a coupling piece supported in an open/closable manner through a hinge to the flow rate control device, connected by opening the coupling piece and being locked to a flow rate control device that is adjacent, and stored by closing the coupling piece and being locked to its own main body.

Advantage of the Invention

According to this invention, by attaching or detaching a clip that is a connection means, the flow rate control device can be attached to or detached from the manifold. Thereby, there is no need to secure space for inserting a tool between adjacent flow rate control devices, therefore it is possible to suppress the mounting pitch between adjacent flow rate control devices to the minimum, allowing the miniaturization of the flow rate control unit.

BRIEF DESCRIPTIONS OF THE DRAWINGS

FIG. 5A is a main part front view showing a state before connection, and FIG. 5B includes a top view and a front view showing a state after connection.

DETAILED DESCRIPTION OF THE EMBODIMENT(S)

Figure 1:
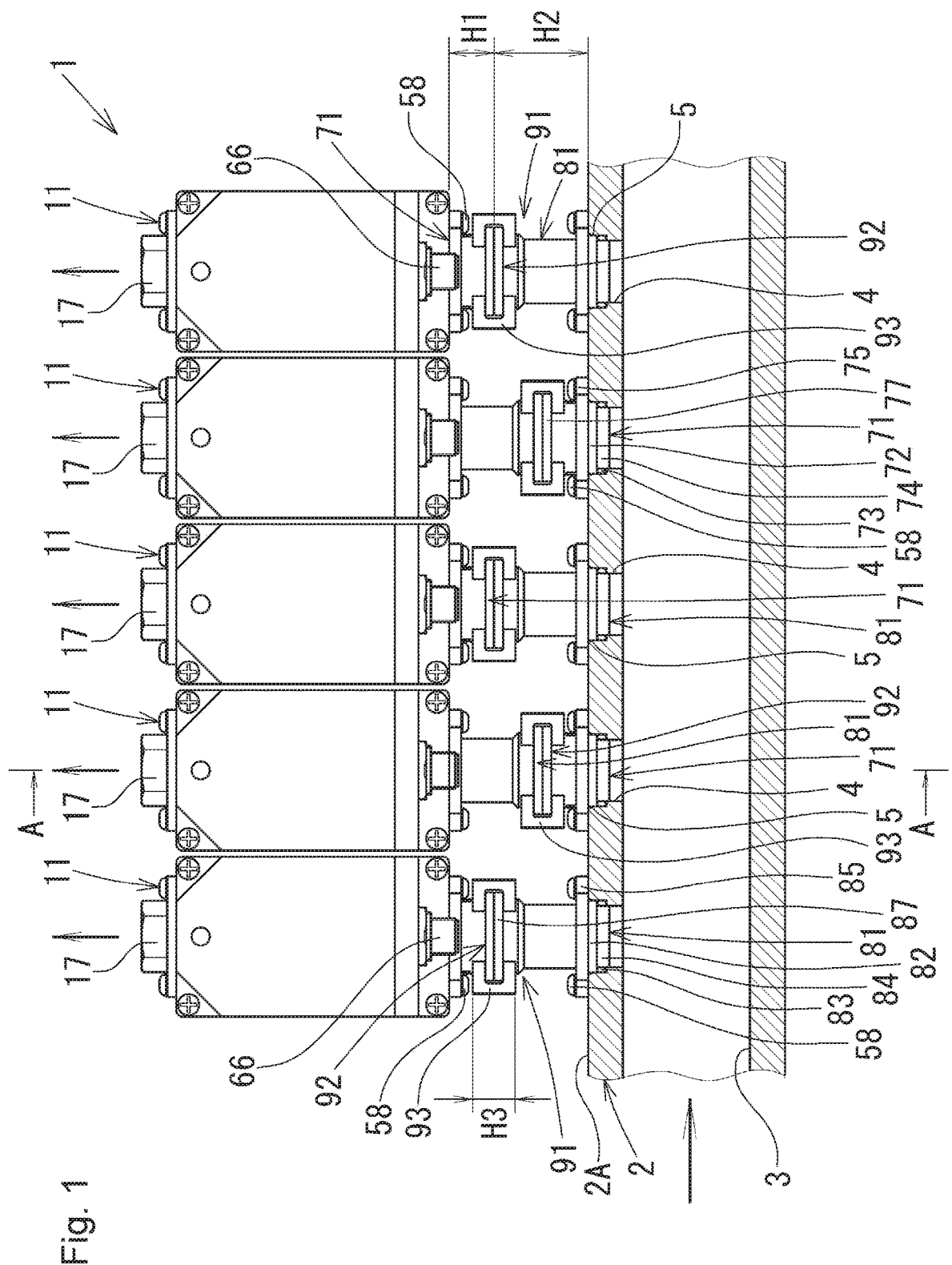
FIG. 1 is a diagram showing part of a front view of a flow rate control unit of this embodiment, especially showing a manifold in a cross-sectional view.
Figure 2:
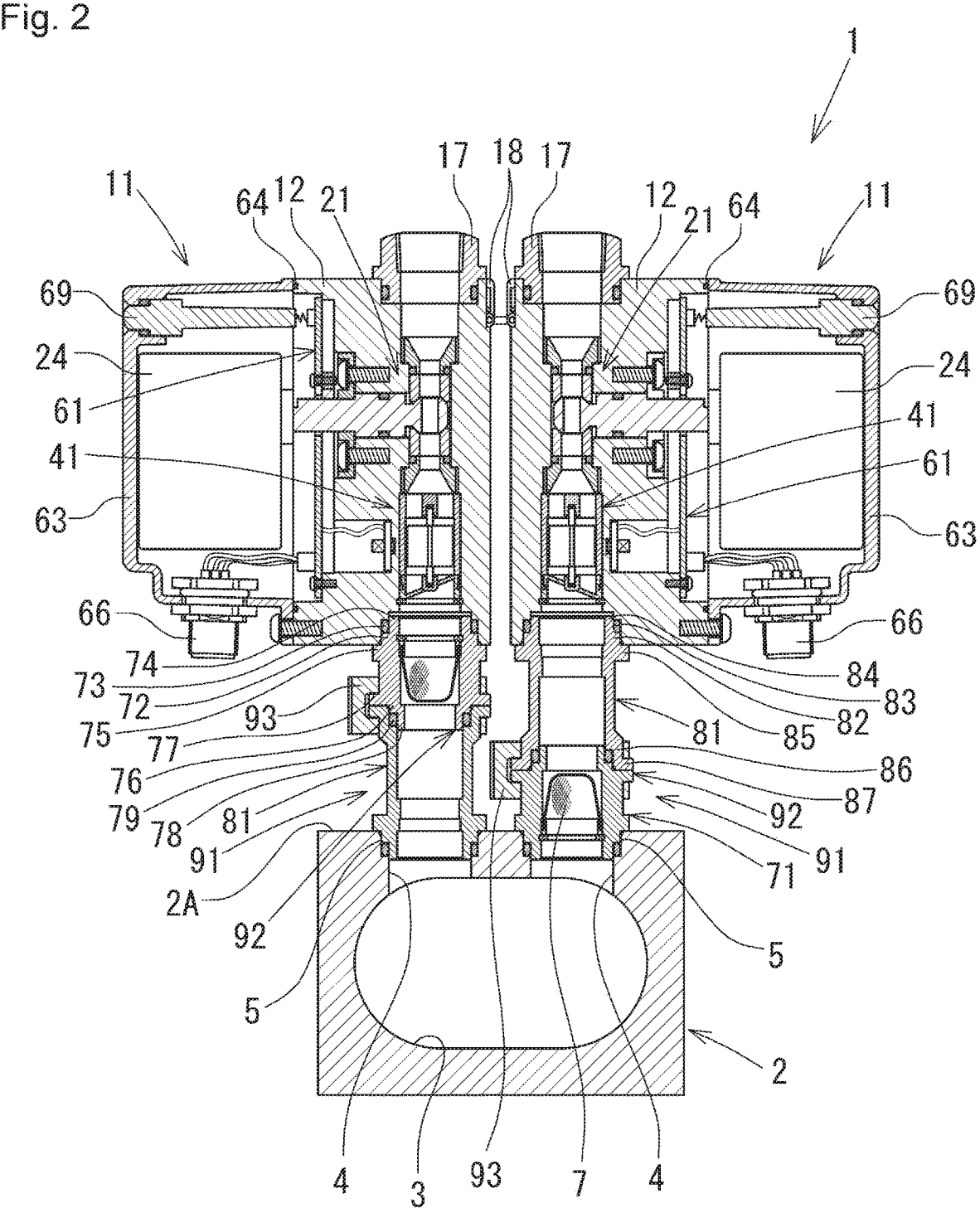
FIG. 2 is an arrow view of A-A in FIG. 1.

An embodiment of this invention is explained referring to attached drawings. Note that for convenience, the left-right (direction) in FIG. 1 is defined as the front-back of a flow rate control unit 1, the left-right (direction) in FIG. 2 as the left-right of the flow rate control unit 1, and the up-down (direction) in FIGS. 1 through 3 as the up-down (direction) of the flow rate control unit 1 or flow rate control devices 11. As shown in FIGS. 1 and 2, the flow rate control unit 1 is provided with a manifold 2 formed in an approximate rectangular parallelepiped extending in the front-back direction, a plurality of flow rate control devices 11 mounted juxtaposedly on the manifold 2, and joints 91 (connection means) that connect the manifold 2 and the flow rate control devices 11.

(Manifold)

The manifold 2 has a cavity 3 that extends in the front-back direction inside the manifold 2, and an introduction port (not shown) that is installed on the lower part of the manifold 2 and introduces a fluid ("water" in this embodiment) that went through a strainer (not shown) to the cavity 3. Also, the manifold 2 has a plurality of ports 4 that open to the upper face 2A of the manifold 2 and communicate with the cavity 3.

As shown in FIG. 2, the ports 4 are arranged in two rows with a constant interval in the left-right direction. Also, as shown in FIG. 1, the ports 4 in each row are arranged with constant intervals in the front-back direction. In other words, the ports 4 are arranged in a grid shape elongated in the front-back direction. Note that formed on the opening of each of the ports 4 is a connection port 5 having a larger inner diameter than the inner diameter of the port 4. Also, adopted as the material of the manifold 2 is plastic or non-magnetic metal.

(Flow Rate Control Device)

Figure 3:
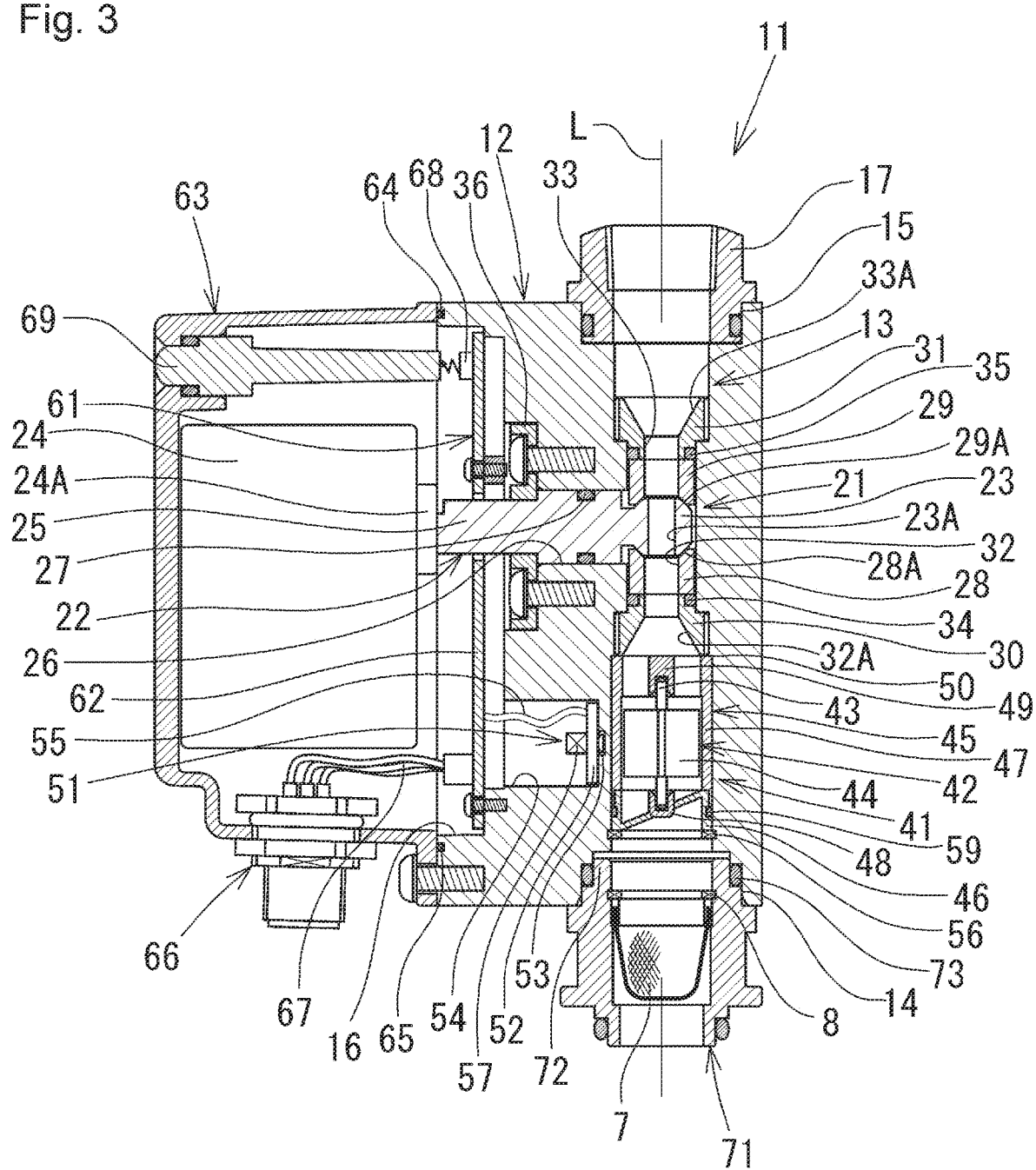
FIG. 3 is a diagram showing an enlarged view of the left-side flow rate control device in FIG. 2.

As shown in FIG. 3, the flow rate control device 11 has a body 12 made of plastic or non-magnetic metal, and a flow path 13 that extends in the up-down direction inside the body 12 where a fluid flows upwards. The body 12 has an inflow port 14 that opens on the lower end of the body 12 where a below-mentioned joint 91 (connection means) is connected, and an outflow port 15 that opens on the upper end of the body 12 where an adapter 17 is connected (fitted). Here, for convenience, flow paths from the inflow port 14 to the outflow port 15 of the body 12 are collectively called the flow path 13. Note that formed on the adapter 17 is a taper pipe thread for connecting a pipe connector.

(Flow Rate Adjusting Valve)

The flow rate control device 11 is provided with a flow rate adjusting valve 21 constituted of a ball valve mechanism. The flow rate adjusting valve 21 has a valve element 22 provided with a shaft part 25 and a ball part 23 that is installed on the tip (right end in FIG. 3) of the shaft part 25 and can block the flow path 13. The base end (left end in FIG. 1) of the shaft part 25 is connected to a rotation shaft 24A of a motor actuator 24. Formed on the body 12 is an shaft hole 26 that penetrates the body 12 in the horizontal direction (left-right direction in FIG. 3) and communicates with the flow path 13. The shaft part 25 of the valve element 22 is fitted slidably into the shaft hole 26. Note that space between the shaft part 25 of the valve element 22 and the shaft hole 26 of the body 12 is sealed with an O-ring 27. Also, the motor actuator 24 comprises a stepping motor, a deceleration mechanism, and a position detecting sensor.

The flow rate adjusting valve 21 has a pair of ball packings 28 and 29 disposed in the upstream side and the downstream side of the flow path 13 sandwiching the ball part 23 of the valve element 22. The ball packing 28 in the upstream side is pressed toward the downstream side (upper side in FIG. 3) with a fixing nut 30, thereby the valve seat part 28A closely contacts the ball part 23 in a slidable manner. Also, the ball packing 29 in the downstream side is pressed toward the upstream side (lower side in FIG. 3) with a fixing nut 31, thereby a valve seat part 29A closely contacts the ball part 23 in a slidable manner. Here, what is shown in FIG. 3 is a state where the flow rate adjusting valve 21 is fully open, and in this state the axial line of a flow path 23A of the ball part 23 of the valve element 22 coincides with the axial line of a flow path 32 that extends penetrating the ball packing 28 and the fixing nut 30 and the axial line of a flow path 33 that extends penetrating the ball packing 29 and the fixing nut 31, and further coincides with the axial line L of the flow path 13.

Note that the flow path 32 has a diameter-reducing part 32A whose flow path area is gradually reduced on the end part in the opposite side (lower side in FIG. 3) of the ball part 23 side (valve seat part 28A side). Also, the flow path 33 has a diameter-expanding part 33A whose flow path area is gradually expanded on the end part in the opposite side (upper side in FIG. 3) of the ball part 23 side (valve seat part 29A side). Also, space between the fixing nut 30 and the flow path 13 is sealed with an O-ring 34. Also, space between the fixing nut 31 and the flow path 13 is sealed with an O-ring 35. Furthermore, indicated with a code 36 in FIG. 3 is a retaining plate that prevents the valve element 22 from moving in the axial line direction (left-right direction in FIG. 3) relative to the shaft hole 26.

(Flow Rate Measurement Part)

The flow rate control device 11 is provided with a flow rate measurement part 41 that indirectly measures the flow rate of a fluid flowing in the upstream side (lower side in FIG. 3) of the flow rate adjusting valve 21 based on the rotation rate of a below-mentioned impeller 42. The flow rate measurement part 41 is so-called an impeller (turbine) type flowmeter, having an impeller 42, and a supporting frame 45 that rotatably supports the impeller 42. The impeller 42 has a rotation shaft 43 disposed on the axial line L (see FIG. 3) of the flow path 13, and a plurality of ("four" in this embodiment) blade parts 44 (turbine blades) installed with equal intervals around the rotation shaft 43. Then, adopted in manufacturing the impeller 42 in this embodiment is metal injection molding (MIM) having non-magnetized magnetic metal powder as the material, forming the rotation shaft 43 and the plurality of blade parts 44 (simultaneously) in one body. Note that adopted as the material (magnetic body) for metal injection molding is magnetic stainless steel (e.g., SUS 630) for example.

As shown in FIG. 3, the supporting frame 45 is configured divided into a rotational-flow plate 46 that makes a passing fluid generate a rotational flow, and a sleeve 47 that surrounds the blade parts 44 of the impeller 42. The rotational-flow plate 46 is made of plastic or non-magnetic metal, and has a shaft bearing part 48 installed in the center to support the lower end of the rotation shaft 43 of the impeller 42. The sleeve 47 is made of plastic or non-magnetic metal, and has a shaft bearing part 49 installed in the center to support the upper end of the rotation shaft 43 of the impeller 42. Note that the supporting frame 45 (sleeve 47) is positioned in the up-down direction, that is, the direction along the axial line L of the flow path 13 by its upper end abutting a step part 50 formed in the flow path 13. Also, the supporting frame 45 (rotational-flow plate 46) is prevented from moving downwards (toward the upstream side) by a C-shaped retaining ring 56 attached to the inner circumference of the flow path 13.

On the other hand, the flow rate measurement part 41 is provided with a sensor unit 51 that measures the rotation rate of the impeller 42. The sensor unit 51 comprises a sensor board 52, a GMR (Giant Magnetoresistance) sensor 53 mounted on the sensor board 52, and a bias magnet 57 (e.g., ferritic bulk magnet) that applies a bias magnetic field to the GMR sensor 53. The sensor board 52 is accommodated by a sensor unit accommodation part 54 that extends from a recessed part 16 of the body 12 toward the impeller 42 disposed inside the flow path 13. Then, the sensor unit 51 measures the rotation rate of the impeller 42 based on variation in the magnetic field intensity accompanying the rotation of the impeller 42 detected by the GMR sensor 53, and outputs a pulse signal (called "rotation rate signal" for convenience) corresponding to the measurement result to a controller 61 mentioned below.

Note that in this embodiment the GMR sensor 53 has a Wheatstone bridge configured by two GMR elements disposed on the sensor board 52 with an interval in the rotation direction of the impeller 42 (front-back direction) so as to detect variation in the magnetic field intensity based on variation in the resistance value of the two GMR elements. Also, indicated with a code 55 in FIG. 3 is a signal cable that connects the sensor board 52 and a control board 62 of the controller 61. Furthermore, indicated with a code 59 in FIG. 3 is an O-ring that seals space between the rotational-flow plate 46 and the sleeve 47.

(Controller)

The flow rate control device 11 is provided with the controller 61 that feedback-controls the opening degrees of the flow rate adjusting valve 21 based on the measurement result (rotation rate of the impeller 42) by the flow rate measurement part 41 mentioned above. The controller 61 is so-called a microcomputer provided with an arithmetic part, a memory part, etc., and performs a feedback control (PID control) of the opening degrees of the flow rate adjusting valve 21 based on the rotation rate signal (flow rate measured by the flow rate measurement part 41) outputted from the flow rate measurement part 41. That is, the controller 61 converts the rotation rate signal into the measured value of the flow rate, in other words, converts the rotation rate into the flow rate based on a data table, and arithmetically processes the measured value (flow rate measured value) and a set value (flow rate target value). Then, it is configured so that by controlling the motor actuator 24 based on the arithmetic processing result, the valve element 22 and further the ball part 23 are rotated to adjust the flow rate of a fluid flowing through the flow path 13.

The controller 61 has the control board 62 accommodated in the recessed part 16 formed on a side face (left side face in FIG. 3) of the body 12. Installed on a side face of the body 12 is a housing 63 made of an aluminum alloy that accommodates the motor actuator 24, and space between the housing 63 and the recessed part 16 is tightly sealed with a packing 64. Note that the packing 64 is fit in a packing groove 65 formed on the peripheral edge of the recessed part 16 of the body 12. Also, installed on the lower part of the housing 63 is a water-proof connector 66 used for communication ("RS485" in this embodiment) with the outside. Also, the water-proof connector 66 and the control board 62 are connected with a signal cable 67 ("5 core" in this embodiment). Also, indicated with a code 68 in FIG. 3 is an LED (full-color) mounted on the control board 62. Furthermore, indicated with a code 69 in FIG. 3 is an optical transmission window made of a transparent resin for visually recognizing the LED 68 from the outside.

(Connection Means)

As shown in FIG. 2, the joint 91 (connection means) is formed of a linear pipe body, and has a joint adapter 71 (first pipe member) and a joint adapter 81 (second pipe member) dividable in the axial line direction (up-down direction). Formed on the base end of the joint adapter 71 is a first end part 72 that can be connected to the connection port 5 of each of the ports 4 of the manifold 2 and the inflow port 14 of the flow rate control device 11. Then, the joint adapter 71 is connected to the manifold 2 by inserting the first end part 72 (shaft) to the connection port 5 (hole) of the port 4, and is connected to the flow rate control device 11 by inserting the first end part 72 (shaft) to the inflow port 14 (hole) of the flow rate control device 11 on the other hand. In other words, the connection port 5 of each of the ports 4 of the manifold 2 and the inflow port 14 of the flow rate control device 11 are formed in the same shape (having the same inner diameter).

Note that formed on the tip of the first end part 72 of the joint adapter 71 is a small-diameter part 74 for attaching an O-ring 73, and space between the first end part 72 of the joint adapter 71 and the connection port 5 of each of the ports 4 of the manifold 2 or the inflow port 14 of the flow rate control device 11 is sealed with the O-ring 73. Also, installed inside the joint adapter 71 is a filter 7 for capturing foreign matters contained in a fluid passing through the joint adapter 71. Furthermore, indicated with a code 8 in FIG. 3 is a C-shaped retaining ring that prevents the filter 7 from moving in the axial line direction (up-down direction) relative to the joint adapter 71.

On the other hand, formed on the base end of the joint adapter 81 is a first end part 82 in the same shape as the first end part 72 of the joint adapter 71 mentioned above. That is, the joint adapter 81 is connected to the manifold 2 by inserting the first end part 82 (shaft) to the connection port 5 (hole) of the port 4, and is connected to the flow rate control device 11 by inserting the first end part 82 (shaft) to the inflow port 14 (hole) of the flow rate control device 11 on the other hand. Note that formed on the tip of the first end part 82 of the joint adapter 81 is a small-diameter part 84 for attaching an O-ring 83, and space between the first end part 82 of the joint adapter 81 and the connection port 5 of each of the ports 4 of the manifold 2 or the inflow port 14 of the flow rate control device 11 is sealed with the O-ring 83.

Then, the joint adapter 71 (81) is positioned in the axial line direction (up-down direction) relative to the flow rate control device 11 by a first flange 75 (85) formed on the outer circumference of the first end part 72 (82) abutting the lower end face of the body 12 of the flow rate control device 11. Also, the joint adapter 71 (81) is attached to the flow rate control device 11 by fixing the first flange 75 (85) to the body 12 with a screw 58 (see FIG. 1). On the other hand, the joint adapter 71 (81) is positioned in the axial line direction (up-down direction) relative to the manifold 2 by the first flange 75 (85) formed on the outer circumference of the first end part 72 (82) abutting the upper end face of the manifold 2. Also, the joint adapter 71 (81) is attached to the manifold 2 by fixing the first flange 75 (85) to the manifold 2 with the screw 58.

Then, the joint 91 inserts a second end part 76 (shaft) formed on the tip of the joint adapter 71 (first pipe member) to a second end part 86 (hole) formed on the tip of the joint adapter 81 (second pipe member), thereby the joint adapter 71 and the joint adapter 81 are coupled, and as the result the flow rate control device 11 is connected to the manifold 2. Note that formed on the tip of the second end part 76 of the joint adapter 71 is a small-diameter part 78 for attaching an O-ring 79, and space between the second end part 76 of the joint adapter 71 and the second end part 86 of the joint adapter 81 is sealed with the O-ring 79.

As shown in FIGS. 1 and 2, the joint 91 has a second flange 77 formed on the outer circumference of the joint adapter 71 and a second flange 87 formed on the outer circumference of the joint adapter 81 in contact with each other. Thereby, the joint adapter 71 and the joint adapter 81 are relatively positioned in the axial line direction (up-down direction). Also, the joint 91 prevents the joint adapter 71 and the joint adapter 81 from moving relatively in the axial line direction (up-down direction) by attaching a metallic clip 93 over the coupling part 92 between the second flange 77 and the second flange 87 superimposed on each other. Note that a commercially-available metallic fastener can be used as the clip 93. Also, adopted as the material of the joint adapter 71 and the joint adapter 81 is plastic or metal.

As shown in FIGS. 1 and 2, the joint adapter 71 and the joint adapter 81 of the joint 91 are different in the axial line direction length. Here, the axial line direction length of the joint adapter 71 is a distance from the mounting face of the first flange 75 to the coupling face of the second flange 77 (H1 in FIG. 1). On the other hand, the axial line direction length of the joint adapter 81 is a distance from the mounting face of the first flange 85 to the coupling face of the second flange 87 (H2 in FIG. 1). Note that the axial line direction length of the joint adapter 81 (H2) is determined to be the sum of the axial line direction length of the joint adapter 71 (H1) and the thickness of the clip 93 (H3 in FIG. 1) or greater (H2≥H1+H3).

Then, as shown in FIG. 1, the flow rate control unit 1 has the joints 91 arranged on the manifold 2 so that the orientations of the joints 91 of the flow rate control devices 11 adjacent in the front-back direction (left-right direction in FIG. 1) alternate (up and down reversed). In other words, the joints 91 are arranged on the manifold 2 so that the joint adapter 71 (first pipe member) and the joint adapter 81 (second pipe member) alternate between the joints 91 adjacent in the front-back direction. In the same manner, as shown in FIG. 2, the flow rate control unit 1 has the joints 91 arranged on the manifold 2 so that the orientations of the joints 91 of the flow rate control devices 11 adjacent in the left-right direction (left-right direction in FIG. 2) alternate. In other words, the joints 91 are arranged on the manifold 2 so that the joint adapter 71 and the joint adapter 81 alternate between the joints 91 adjacent in the left-right direction.

Therefore, as shown in FIGS. 1 and 2, the flow rate control unit 1 has different positions (heights from the upper face of the manifold 2) of the coupling parts 92 of the joint adapter 71 and the joint adapter 81, that is the positions of the clips 93, between the joints 91 of the flow rate control devices 11 adjacent in the front-back direction and in the left-right direction. Note that indicated with a code 18 in FIG. 2 is a coupler that is installed on the upper part of each of the flow rate control devices 11 for coupling the flow rate control devices 11 adjacent in the left-right direction (back to back) on the manifold 2. Here, shown in FIG. 2 is a state before bridging the coupler 18, that is, an uncoupled state between the flow rate control devices 11 adjacent back to back.

(Coupler)

Figure 4A:
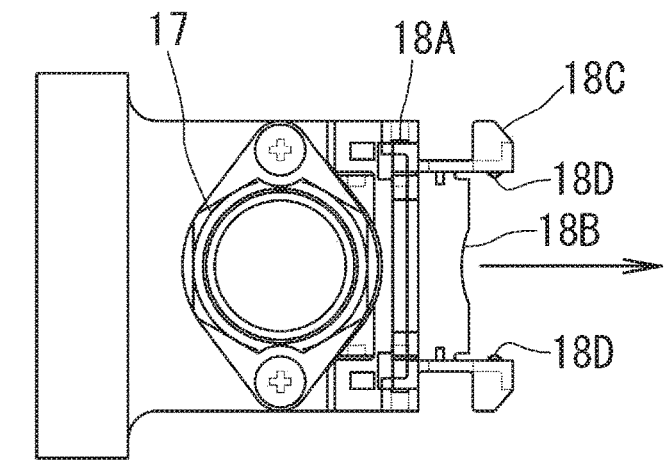
FIGS. 4A and 4B are diagrams showing how to use a coupler in FIG. 2, where FIG. 4A includes a top view and a front view showing a state before storing it, and FIG. 4B includes a top view and a front view showing a state after storing it.
Figure 4B:
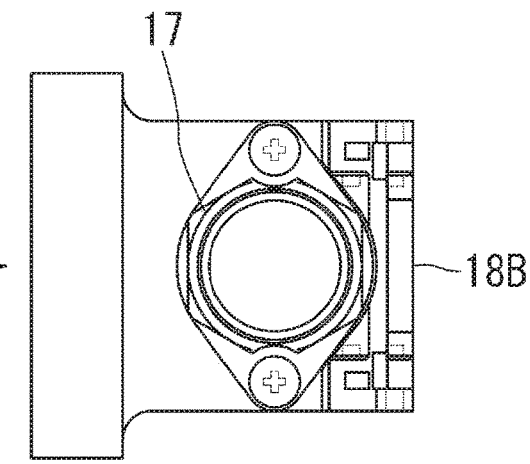
Figure 4B:
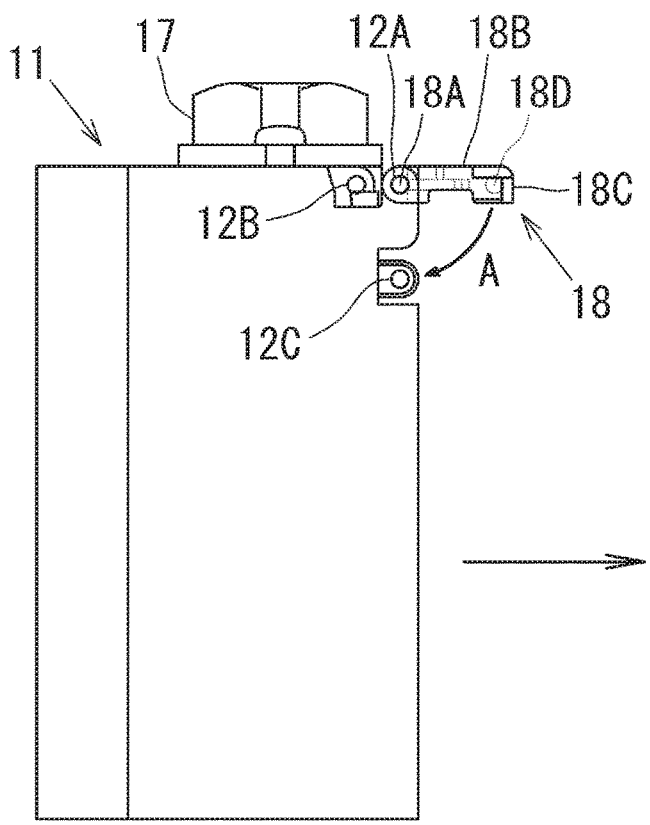
Figure 4B:
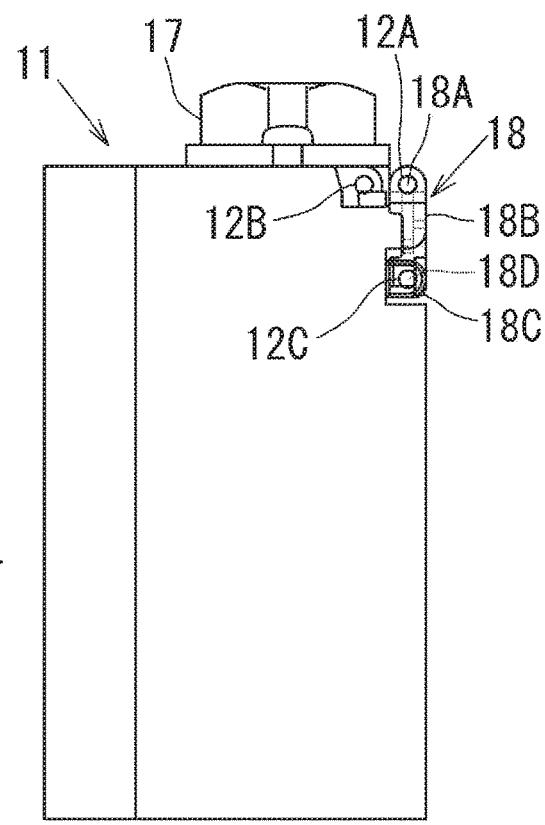
Figure 5A:
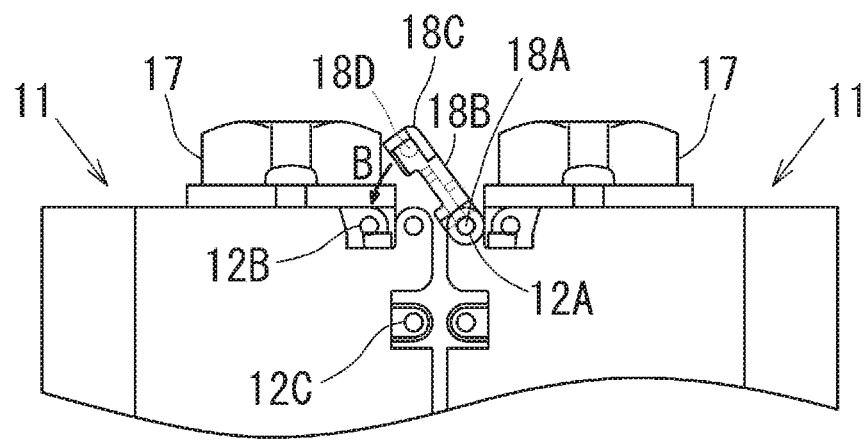
FIGS. 5A and 5B are diagrams showing how to use the coupler in FIG. 2, where
Figure 5B:
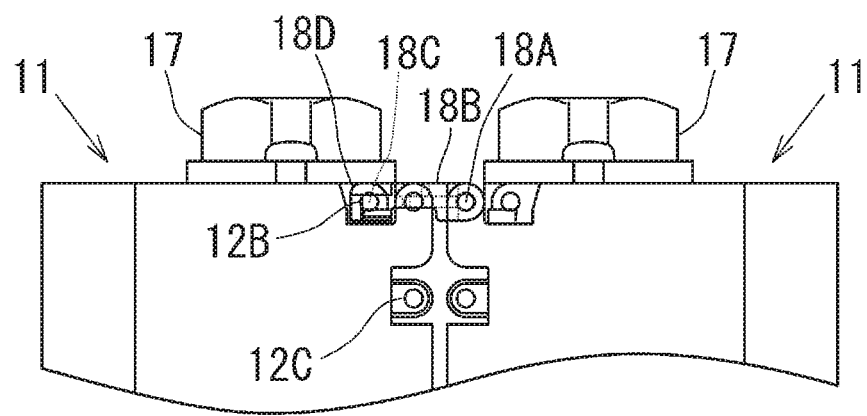
Figure 5B:
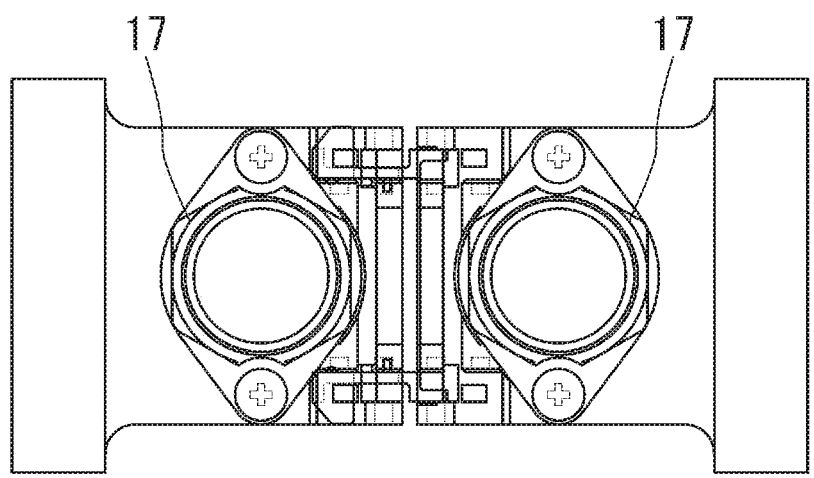

As shown in FIGS. 4 and 5, the coupler 18 is integrated with the flow rate control device 11, and has a coupling piece 18B supported in a manner allowing open/close operations through a hinge 18A to a shaft bearing 12A on the main body wall face. Installed on the tip of the coupling piece 18B are brim parts 18C protruding so as to facilitate pinching it with fingers, and a pair of opposing locking claws 18D is formed on the inner sides of the brim parts 18C. Also, installed in positions recessed by the thickness of the brim parts 18C from the main body wall face of the flow rate control device 11 are locking holes 12B and 12C that fit the above-mentioned locking claws 18D. These locking holes 12B and 12C are disposed as a pair in positions corresponding to both the horizontal position and the vertical position of the coupling piece 18B.

(Actions)

The actions of the above-mentioned flow rate control unit 1 are explained. First of all, when mounting the flow rate control devices 11 juxtaposedly on the manifold 2, the first end part 72 of the joint adapter 71 (first pipe member) or the first end part 82 of the joint adapter 81 (second pipe member) is connected to the connection port 5 of each of the ports 4 of the manifold 2 in advance. At this time, the joint adapter 71 and the joint adapter 81 are arranged so that the joint adapters 71 (81) adjacent in the front-back direction (left-right direction in FIG. 1) and in the left-right direction (left-right direction in FIG. 2) alternate, that is, lest the same kind of joint adapters 71 (81) be adjacent to each other.

On the other hand, in the flow rate control device 11, the flow rate control device 11 where the first end part 72 of the joint adapter 71 (first pipe member) is connected to the inflow port 14, and the flow rate control device 11 where the first end part 82 of the joint adapter 81 (second pipe member) is connected to the inflow port 14 are prepared. Then, each of the flow rate control devices 11 is attached to the manifold 2 so as to have the joint adapter 71 and the joint adapter 81 coupled. Thereby, the joints 91 adjacent in the front-back direction and in the left-right direction on the manifold 2 alternate up and down, in other words, the positions (heights) of the couplers 92 alternate.

In this state, by attaching the clip 93 to the coupling part 92 of each of the joints 91, the coupling between the joint adapter 71 and the joint adapter 81 is held, and further the connection of each of the flow rate control devices 11 to the manifold 2 is held. Also, the flow rate control devices 11 adjacent in the left-right direction is coupled by bridging the coupler 18 of one of the flow rate control devices 11 to the coupler 18 of the other flow rate control device 11. Note that the timing to attach the clip 93 and the timing to bridge the coupler 18 are arbitrary. Also, when removing one of the flow rate control devices 11 from the manifold 2, by removing the clip 93 and releasing the coupling with the coupler 18, an arbitrary flow rate control device 11 can be simply removed (pulled out) from the manifold 2.

Next, explained is the method to use the coupler 18. As shown in FIG. 4, the coupler 18 of this embodiment can be stored in the main body of the flow rate control device 11. The method is that first in FIG. 4A the brim part 18C on the tip is pinched with fingers from both sides and rotated in the clockwise direction indicated with an arrow A in the figure through the hinge 18A. Then, once the coupling piece 18B is pushed in until it comes to the vertical position, the locking claw 18D fits in the locking hole 12C of the main body, and the coupling piece 18B is held (locked) to the main body in a closed state. Thereby, as shown in FIG. 4B, the coupler 18 can be compactly stored without sticking out from the side face of the main body.

Also, as shown in FIG. 5, the coupler 18 of this embodiment can be connected to the adjacent flow rate control device 11. Note that in FIG. 5 the coupler stored in the left-side flow rate control device 11 is not shown for easy understanding of the structure. First in FIG. 5A, the coupler 18 of the left-side flow rate control device 11 is stored, the coupler 18 of the right-side flow rate control device 11 is left in an open state, and the flow rate control devices 11 to be coupled are juxtaposed in a back to back state. Next, the right-side coupler 18 is rotated in the anticlockwise direction indicated with an arrow B in the figure, and is bridged to the adjacent flow rate control device 11. Then, once the coupling piece 18B is pushed in until it comes to the horizontal position, the locking claw 18D fits in the locking hole 12B of the partner's main body, and the coupling piece 18B is held (locked) to the main body of the adjacent flow rate control device 11. Thereby, as shown in FIG. 5B, the flow rate control devices 11 can be coupled by leaving the coupler 18 of one of them in a stored state and connecting the coupler 18 of the other to the adjacent flow rate control device 11. Note that when releasing the coupling, the brim part 18C can be pinched with fingers and lifted up, thereby the locking claw 18D comes out of the locking hole 12B, releasing the lock of the coupler 18.

(Flow Rate Control)

First, once a fluid ("water" in this embodiment) is introduced to the manifold 2 by a fluid supply means (such as "pump"), the fluid is supplied to each of the flow rate control devices 11 via each of the ports 4 of the manifold 2 and each of the joints 91. The fluid introduced to each of the flow rate control devices 11, that is, the fluid flowing through the flow path 13 of each of the flow rate control devices 11 becomes a rotational flow and rotates the impeller 42 of the flow rate measurement part 41.

Then, in each of the flow rate control devices 11, in the flow rate measurement part 41, variation in the magnetic field intensity accompanying the rotation of the impeller 42 is detected by the GMR sensor 53, and the rotation rate of the impeller 42 is measured based on the variation in the magnetic field intensity. The rotation rate signal (pulse signal) as the result of measuring the flow rate by the flow rate measurement part 41 is outputted to the controller 61. The controller 61 converts the received rotation rate signal into the flow rate (flow rate measured value) of the fluid flowing through the flow path 13.

Furthermore, the controller 61 performs an arithmetic processing (PID processing) of the flow rate measured value and a flow rate control signal (flow rate target value) received via the signal cable 67 of the water-proof connector 66 from an external control device (not shown), and outputs the control signal (motor control signal) as the arithmetic processing result to the motor actuator 24. Thereby, the motor actuator 24 operates based on the motor control signal. Thereby, the opening degrees of the flow rate adjusting valve 21 (ball valve), that is, the flow path area of the flow path 13 is adjusted, and further the flow rate of the fluid flowing through the flow path 13 is adjusted.

(Efficacy)

According to this embodiment, the flow rate control unit 1 has each of the flow rate control devices 11 connected to (mounted juxtaposedly on) the manifold 2 by the joint 91 (connection means) interposed between each of the flow rate control devices 11 and the manifold 2. Also, the joint 91 has the joint adapter 71 (first pipe member), the joint adapter 81 (second pipe member) extractably coupled with the joint adapter 71, and the clip 93 that is attached to the coupling part 92 between the joint adapter 71 and the joint adapter 81 and holds the coupling part 92.

Therefore, each of the flow rate control devices 11 can be attached to or detached from the manifold 2 by manually operating (attaching/detaching) the clip 93 without using a tool, thereby allowing rationalization of assembly work in the manufacturing process, work to replace the flow rate control devices 11 at the time of maintenance, etc. Also, because there is no need to secure space to insert a tool between the adjacent flow rate control devices 11, the mounting pitch between the adjacent flow rate control devices 11 (joints 91) can be reduced to the minimum, allowing miniaturization of the flow rate control unit 1. Furthermore, because the flow rate control devices 11 adjacent in the left-right direction, that is, the flow rate control devices 11 adjacent back to back are coupled by bridging the coupler 18 of one of the flow rate control devices 11 to the other flow rate control device 11, the mounting strength of the flow rate control devices 11, further the rigidity of the flow rate control unit 1 can be enhanced. In addition, it is possible to prevent the relative movement of a pair of the flow rate control devices 11 coupled by the coupler 18, having the coupler 18 function as a rotation stopper for the flow rate control devices 11. That is, it can prevent the rotation centering on the axial line L (see FIG. 3) in each of the flow rate control devices 11 mounted juxtaposedly on the manifold 2.

Also, the axial line direction length of the joint adapter 71 (H1) is different from the axial line direction length of the joint adapter 81 (H2). Especially, in this embodiment, the axial line direction length of the joint adapter 81 (H2) is set to the sum of the axial line direction length of the joint adapter 71 (H1) and the thickness of the clip 93 (H3) or greater (H2≥H1+H3). Then, the joints 91 are arranged on the manifold 2 so that the joint adapter 71 (first pipe member) and the joint adapter 81 (second pipe member) alternate between the adjacent joints 91 in the front-back and in the left-right directions, in other words, the heights of the coupling parts 92 of the joint adapter 71 and the joint adapter 81 and further the mounting heights of the clips 93 alternate between the adjacent flow rate control devices 11, thereby the operability of the clip 93 is improved, and further the assemblability and maintainability can be improved.

Also, according to this embodiment, because the impeller 42 of the flow rate measurement part 41 is manufactured by metal injection molding having a non-magnetized magnetic body as the material, the impeller 42 of a complex shape can be formed with high accuracy. Also, in comparison with a cutting-processed impeller, the manufacturing cost can be greatly reduced. Thereby, the rotation shaft 43 and the plurality of the blade parts 44 of the impeller 42 can be formed in one body, and in comparison with an impeller whose rotation axis 43 and plurality of blade parts 44 are separately manufactured, the number of parts can be reduced. Also, in the viewpoint of the manufacturing cost reduction, in an impeller manufactured by joining (press-fitting, bonding, etc.) its rotation shaft 43 and plurality of blade parts 44 instead of the cutting process, stricter quality control accompanying a decrease in reliability of the joined parts becomes a problem. However, the impeller 42 of this embodiment can dissolve these problems by adopting metal injection molding.

Note that embodiments are not limited to the one mentioned above but can be configured in the following manner for example. Although explained in the above-mentioned embodiment was the flow rate control device 11 that adopted an impeller (turbine) type flowmeter, the flow rate control device 11 can adopt, for example, a Karman vortex flowmeter, an electromagnetic flowmeter, an ultrasonic flowmeter, a differential pressure flowmeter, a Coriolis flowmeter, a thermal flowmeter, etc. Also, although explained in the above-mentioned embodiment was the flow rate control device 11 provided with the flow rate adjusting valve 21 that adopted a ball valve, the flow rate adjusting valve 21 can adopt a needle valve, a globe valve, a gate valve, a butterfly valve, etc.

LEGENDS

1: Flow rate control unit
2: Manifold
11: Flow rate control device
12: Body
12A: Shaft bearing
12B: Locking hole
12C: Locking hole
18: Coupler
18A: Hinge
18B: Coupling piece
18C: Brim part
18D: Locking claw
71: Joint adapter (First pipe member)
81: Joint adapter (Second pipe member)
91: Joint (Connection means)
92: Coupling part
93: Clip

What is claimed is:
1. A flow rate control unit, comprising:
a manifold that extends in a front-back direction,
a plurality of flow rate control devices juxtaposedly mounted on the manifold in the front-back direction, and a plurality of connection means that connects the manifold and the flow rate control devices, each of the connection means corresponding to one of the flow rate control device, wherein the connection means is provided with a first pipe member, a second pipe member that is coupled to the first pipe member by the first pipe member being inserted into the second pipe member, and a clip that holds a connection part connecting the first pipe member and the second pipe member in an axial line direction that is perpendicular to the front-back direction, wherein the first pipe member and the second pipe member have different axial line direction lengths that are measured in the axial line direction, and the connection means, which are disposed between the flow rate control devices and the manifold in the axial line direction, have the first pipe members and the second pipe members that are alternately arranged in the front-back direction.

2. The flow rate control unit according to claim 1, wherein the axial line direction length of the second pipe member (H2) is set to be equal to or more than a sum (H1+H3), H1 is the axial line direction length of the first pipe member (H1) and H3 is a thickness of the clip.

3. The flow rate control unit according to claim 2, wherein each of the flow rate control devices is provided with a coupler that couples the two of the flow rate control devices.

4. The flow rate control unit according to claim 3, wherein the coupler is
provided with a coupling piece that is configured such that opening and closing is allowed via a hinge to the flow rate control device,
connected by opening the coupling piece and being locked to another of the flow rate control devices that is adjacent, and
stored by closing the coupling piece and being locked to its own main body.

5. The flow rate control unit according to claim 1, wherein each of the flow rate control devices is provided with a coupler that couples the two of the flow rate control devices.

6. The flow rate control unit according to claim 5, wherein the coupler is
provided with a coupling piece that is configured such that opening and closing is allowed via a hinge to the flow rate control device,
connected by opening the coupling piece and being locked to another of the flow rate control devices that is adjacent to the flow rate control device, and
stored by closing the coupling piece and being locked to its own main body.

* * * * *